United States Patent [19]

Watrous

[11] 4,346,337

[45] Aug. 24, 1982

[54] VOLTAGE REGULATOR CIRCUIT WITH MULTIPLE CONTROL FUNCTIONS

[75] Inventor: Donald L. Watrous, Liverpool, N.Y.

[73] Assignee: General Electric Company, Schenectady, N.Y.

[21] Appl. No.: 83,179

[22] Filed: Oct. 9, 1979

[51] Int. Cl.³ .............................................. H02P 9/30
[52] U.S. Cl. ....................................... 322/25; 322/28; 322/73
[58] Field of Search ...................... 320/32, 33; 322/25, 322/27, 28, DIG. 2, 72, 73, 20, 21

[56] References Cited

U.S. PATENT DOCUMENTS 3,486,106  12/1969  Dietl ........................................ 322/25
4,044,296  8/1977  Dhyanchand et al. ................ 322/20

Primary Examiner—Robert J. Hickey
Attorney, Agent, or Firm—Marvin Snyder; James C. Davis, Jr.

[57] ABSTRACT

A voltage regulator circuit provides multiple control functions in respect to an automotive alternator including limiting of the field current to within a predetermined level. The regulator circuit includes a current control device for controlling the alternator field current, and a plurality of comparator networks to one of which is applied a field current reference signal and a sensing signal and to others of which are applied various alternator voltage reference signals and voltage sensing signals. The outputs of said comparator networks are employed in an OR fashion to control the field current control device.

5 Claims, 1 Drawing Figure

VOLTAGE REGULATOR CIRCUIT WITH MULTIPLE CONTROL FUNCTIONS

BACKGROUND OF THE INVENTION

The invention relates generally to the electrical system of an automotive vehicle and, more particularly, to the voltage regulator circuits of such systems.

Present day automotive voltage regulators are essentially single purpose circuits employed to regulate the output voltage of the vehicle alternator to within a narrow band of voltages corresponding to the rated battery voltage, under varying load conditions. Simply stated, the regulator provides a modulation of the field current of the alternator as a function of existing battery voltage which is continuously sensed for maintaining the rated voltage level.

Systems have been developed which employ the vehicle alternators to supply relatively high power at above normal voltage to loads such as power tools and resistance heating wires embedded in window material for windshield deicing. To supply such high power, it is desirable to increase the alternator output voltage in order to keep the heating current from becoming excessive. This has been accomplished in one approach by temporarily disconnecting the standard automotive load and the regulator from the alternator, and having the battery supply the load current during the deicing period. In a more recently developed system, the resistance heating element is coupled in series between the alternator output and the battery and standard load. The regulator is controlled to regulate both a substantially elevated voltage at the alternator output and the voltage across the battery. The aforementioned system is disclosed in U.S. Pat. No. 4,267,433 granted May 12, 1981 and entitled "Electrically Heatable Windshield Heater Control Circuit", inventor W. H. Sahm III, filed concurrently with and assigned to the same assignee as that of the present application, now issued as U.S. Pat. No. 4,267,433 on May 12, 1981.

When the alternator voltage is substantially increased over its normal operating voltage, it is possible for the alternator field current to exceed its rated value. Since conventional regulators respond only to battery voltage, or to other output voltages as in the above referenced patent application, they do not protect against excessive field currents that may be generated. Thus, it would be desirable to have a regulator providing an added control of the alternator that is responsive to field current.

SUMMARY OF THE INVENTION

Accordingly, it is an object of the invention to provide a novel and improved voltage regulator circuit for regulating the output voltage of an automotive alternator that prevents the generation of excessive field currents.

Another object of the invention is to provide a novel and improved voltage regulator circuit that provides multiple control functions with respect to an automotive alternator.

A further object of the invention is to provide a novel and improved voltage regulator as above described that is a relatively simple circuit that can be inexpensively manufactured.

These and other objects of the invention are accomplished in accordance with one aspect of the invention by a voltage regulator circuit providing regulation of an automotive regulator and which may be operated at more than one voltage level, said regulator circuit comprising a current control device coupled to the field winding terminal of the alternator for controlling the field current, first means responsive to the voltage across the load circuit supplied by said alternator for supplying a first control signal to said current control device for regulating the alternator voltage to within a predetermined level, and second means responsive to said field current for supplying a second control signal to said current control device for limiting the field current to a predetermined level which results in an alternator voltage that is less than said first predetermined level, whereby said first means is enabled in one operation of said regulator circuit as a function of load voltage and said second means is enabled in a further operation of said regulator circuit as a function of field current.

In accordance with a further aspect of the invention, the voltage regulator circuit employs a plurality of comparator networks each responsive to a reference signal and an alternator voltage, load voltage or field current sensing signal for supplying said first and second control signals to said current control device.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figure of the drawing which is a schematic circuit diagram, partially in block form, of a voltage circuit that is in accordance with the invention.

DETAILED DESCRIPTION OF THE PREFERRED EMBODIMENT

Figure 1:
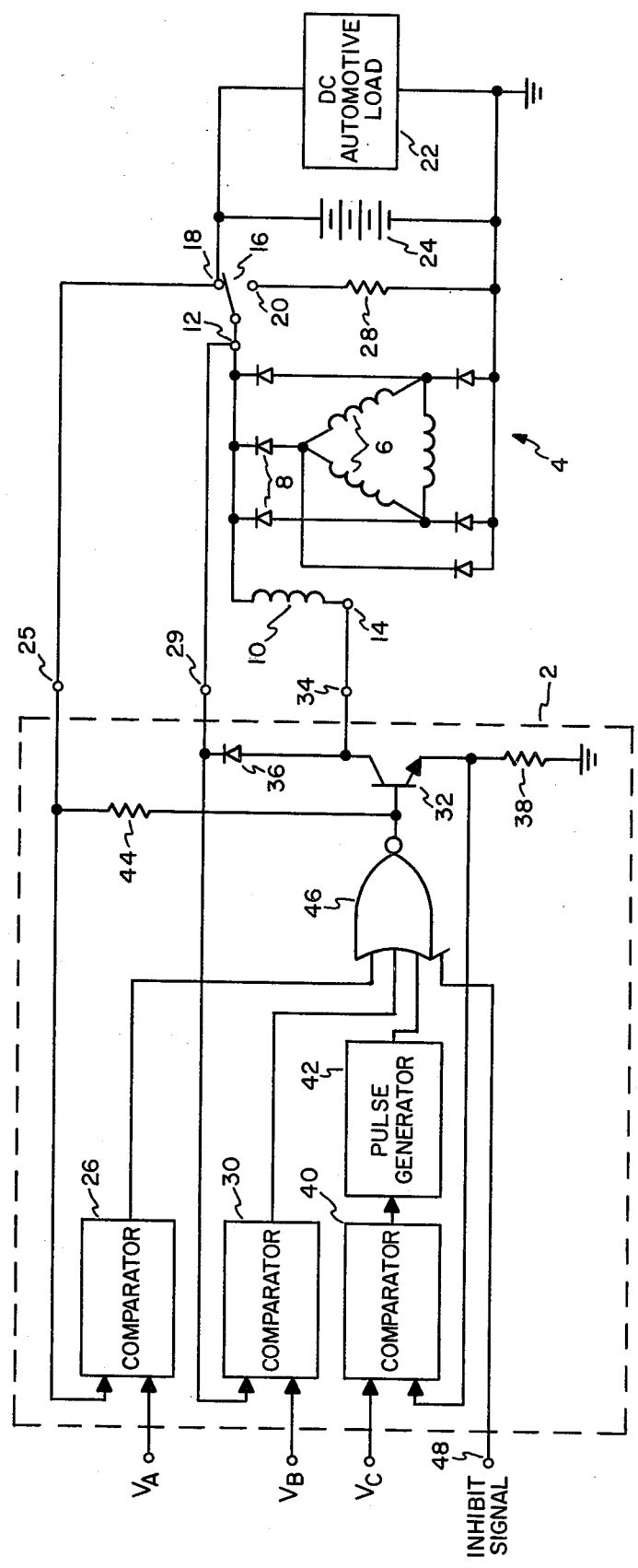

With reference to the figure of the drawing, there is illustrated the inventive voltage regulator circuit 2 which is of a unique circuit configuration for providing multiple control functions with respect to an automotive alternator 4. Briefly, the regulator includes circuitry for sensing the alternator field current magnitude for controlling the alternator operation so as not to exceed a predetermined current, which normally would be the rated field current. In addition, the regulator includes circuitry for responding to multiple reference inputs that provide a number of control functions for the alternator.

The alternator 4 may be a standard component, schematically represented in a simplified form to comprise delta configured stator windings 6 constructed integrally with a diode network including diode elements 8, a rotor field winding 10, an output terminal 12 and a field winding terminal 14. In the alternator operation, current flowing in the field winding 10, which is rotatably mounted on the engine shaft, generates an AC voltage in the stator windings 6 that is proportional to the field current magnitude and shaft RPM. This AC voltage is rectified by the diode network to appear as a substantially DC voltage as output voltage terminal 12 of alternator 4.

Output terminal 12 is coupled to a switching device 16, schematically shown as a mechanical switch having a movable contact and two fixed contacts 18 and 20. When contact 18 is engaged, which is the normal switch position, the alternator is employed to supply current to a DC automotive load 22 and battery 24. Contact 18 is also coupled to input terminal 25 of regulator 2 so as to supply a first sensing signal to a first comparator network 26 of the regulator for providing regulation of the alternator output voltage during a normal operation, as will be subsequently described in detail. When contact 20 is engaged, which is for a limited heating period, the alternator is employed to supply power to a resistive heating element 28. During this period, it may be appreciated that the battery supplies the current requirements of the load current. Output terminal 12 is further coupled to input terminal 29 of regulator 2 for supplying a second sensing signal to a second comparator network 30 which is effective to provide regulation of the alternator output voltage during the heating period.

Regulator circuit 2 also includes a field current control device, illustrated as an NPN transistor 32 having its collector coupled to an input terminal 34 of the regulator to which field winding terminal 14 is connected. The collector is also coupled through a diode 36 to terminal 29 for providing a free wheeling path for transient field currents. The emitter of transistor 32 is coupled through a current sensing element, shown as resistor 38, to a circuit reference point or ground terminal. The emitter is also coupled to a third comparator network 40 of the regulator, whose output is coupled to a pulse generator 42, there being accordingly supplied a third sensing signal to comparator 40 for providing control of the alternator field current. The base of transistor 32 is coupled through a bias resistor 44 to terminal 25 and to the output of a conventional digital OR network 46. The OR network is responsive to one or more outputs from comparators 26 and 30, pulse generator 42 and an inhibit signal at terminal 48 to provide a turn off voltage to the transistor for controlling conduction of the field current.

A reference voltage $V_A$, corresponding to the rated battery voltage, is coupled as a second input to comparator 26. Typically, the rated battery voltage is about 14 volts. Similarly, a reference voltage $V_B$, corresponding to a predetermined voltage level substantially higher than the battery voltage, for example 40 volts, is coupled as a second input to comparator 30. A further reference voltage $V_C$, which corresponds to a predetermined level of field current across the sensing element 38, is coupled as a second input to comparator 40. In a typical operation, the predetermined current level is the rated field current, for example, 5 amperes, providing a reference voltage $V_C$ of about 0.8 volts.

The comparator networks are conventional circuit components for comparing two applied input signals and providing an output signal in accordance with the relative magnitude of the input signals. They may comprise either analog or digital circuits, or a combination of the two. In the exemplary embodiment of the invention being considered, they comprise primarily digital circuitry preceded by analog to digital conversion circuitry for operating on the analog inputs. They accordingly generate one of two digital output signals in accordance with which of the reference signal or the sensing signal inputs is the greater. In addition, since the sensing signals applied to comparators 26 and 30 are of both an increasing and decreasing nature, these comparators are designed preferably to exhibit a well known hysteresis characteristic whereby their output state changes at one level of an increasing sensing signal that is slightly higher than the reference signal and at a different level of a decreasing sensing signal that is slightly lower than the reference signal. Such operation maintains the alternator output within a narrow band of voltages corresponding to whichever reference voltage is effective at the time, as will be further described.

The pulse generator 42 is also a conventional circuit component employed to generate a single pulse in response to a change in output state of comparator 40. As will be further explained, the pulse generator acts to improve the operation efficiency of the current control transistor 32.

Consider now the operation of the regulator circuit 2 in controlling different modes of alternator operation. With switch 16 connected for supplying standard load and battery currents, a first sensing voltage is applied from contact 18 to comparator 26 to be compared with reference voltage $V_A$. Assuming the sensing voltage to be of less magnitude than $V_A$, the comparator generates a disabling output, e.g., a binary "0", that fails to enable OR network 46. With OR network 46 in the disabled state, a control voltage is applied to transistor 32 for keeping it turned on and conducting field current in field winding 10 of the alternator. The conduction of field current acts to increase the alternator voltage and when the sensing voltage at contact 18 exceeds reference voltage $V_A$ by a small amount, determined by the hysteresis characteristic of comparator 26, the comparator output changes state to generate an enabling output, e.g., a binary "1", that enables OR network 46. In the enabled state, a control voltage, normally ground, is applied to transistor 32 for turning it off and cutting off the conduction of field current for decreasing the alternator voltage. Since the field current cannot be changed abruptly due to inductive effects, the field current will decay through diode 36. When the sensing voltage at contact 18 falls below reference voltage $V_A$ by a slight amount, the comparator 26 output again changes state for disabling the OR network and permitting the conduction of field current through transistor 32. Accordingly, a duty cycle control is effected for field current conduction which maintains the alternator output within a narrow band of voltages corresponding to reference voltage $V_A$.

With switch 16 at contact 18, the first sensing voltage is also coupled to comparator 30. However, because reference voltage $V_B$ is of substantially higher level than the first sensing voltage, comparator 30 generates only a disabling output and therefore does not enter into the control process. It may also be pointed out that with the switch in this position, the voltage across the field winding 10 is at the relatively low battery voltage and, in a normal operation, the field current will be self limited to its rated value, which is the rated battery voltage divided by the winding resistance. For a typical winding resistance of 3 ohms, the rated field current is about 5 amperes, as previously stated.

For a heating operation, switch 16 engages contact 20 and a second sensing voltage is applied from terminal 12 to comparator 30 to be compared with reference voltage $V_B$. Operating in the same manner as comparator 26, when the second sensing voltage is generally less than $V_B$, comparator 30 generates a disabling output to OR network 46 for conducting field current through transistor 32. When the sensing signal is generally greater than $V_B$, the comparator generates an enabling output to the OR network for terminating field current through the transistor, whereby the alternator output will be maintained within a narrow band of voltages corresponding to reference voltage $V_B$. During this operation, the battery 24 supplies current to the automotive load 22 so that the first sensing voltage applied to comparator 26 will ordinarily be less than $V_A$ for generating a disabling output to OR network 46 and be out of the control process.

However, for this operation comparator 40 will significantly enter the control process. Field winding 10 is now coupled across a high voltage with a potential for generating field currents much higher than the rated current of field winding 10. A third sensing voltage, which is proportional to the field current and taken from across resistor 38, is applied to comparator 40 to be compared with reference voltage $V_C$. As previously noted, this reference voltage typically corresponds to the rated field current. Because the field current sensed by resistor 38 is only of an increasing type, it is not required that comparator 40 exhibit hysteresis. It operates, therefore, to provide a disabling output, or binary "0", when the sensing voltage is of less magnitude than $V_C$, and an enabling output, or binary "1", when the sensing voltage just exceeds $V_C$. A disabling output fails to enable pulse generator 42 to exert no effect on the conduction of transistor 32. On the other hand, responsive to an enabling output, the pulse generator generates a brief pulse which enables OR network 46 for turning off transistor 32 for a brief time corresponding to the pulse width. The third sensing voltage goes to zero and the output state of comparator 40 changes. The decaying field current is conducted through diode 36. At the end of the generated pulse, the transistor is again turned on and when field current builds up to provide a sensing voltage exceeding $V_C$, the comparator again changes state to provide generation of a subsequent pulse for again briefly turning off the transistor. Accordingly, comparator 40 acts to provide a modulation of the field current for limiting said current to a predetermined level determined by the reference voltage $V_C$. This is an overriding control to that of comparators 26 and 30.

Control of the field current by comparator 40 is also useful should an inexpensive field winding of low impedance be used having a current rating less than the norm. In such example, the impedance of the winding may not be sufficient to limit the field current to below its rated value even with the field winding coupled across a relatively low voltage, such as the battery voltage. By assigning a value to the resistor 38 that provides the requisite sensing voltage, comparator 40 can be readily employed to limit the field current to its rated value, or whatever value desired. The use of OR network 46 provides substantial operating flexibility to the regulator in being also responsive to an Inhibit signal from terminal 48. The Inhibit signal is an overriding signal that enables the OR network to terminate conduction of transistor 32, which may be done for any number of purposes when it should be desirable to reduce the field current and/or the alternator output voltage to zero.

While the invention has been described with reference to a specific embodiment, it may be appreciated that numerous modifications can be made to the disclosed circuitry by those skilled in the art that would not extend beyond the teachings herein set forth. For example, the current control device 32 could readily take another form for providing an on-off modulation of the field current, such as a GTO (gate turn off) thyristor, requiring but minor circuit modification. In addition, the field current sensing element could be made an integral component of the comparator network 40. Further, this element could be employed in the circuit to sense field current directly in the field winding, in which case the sensing signal would have both increasing and decreasing characteristics and employ a comparator with hysteresis. The appended claims are intended to include within their meaning these and any other modifications that fall within the true scope and spirit of the invention.

What I claim as new and desire to secure as Letters Patent of the United States is:

1. A voltage regulator circuit for providing regulation of an electric alternator, said alternator having an output terminal for supplying energy to a load circuit and having a field winding terminal, said regulator circuit comprising:

a control device coupled to said field winding terminal for controlling the field current of said alternator;

first means responsive to the voltage across said load circuit for causing application of a first control signal to said current control device for regulating said alternator voltage at said output terminal to within a predetermined voltage level;

second means responsive to said field current for causing application of a second control signal to said current control device for limiting the field current to a predetermined current level giving rise to an alternating voltage at said output terminal of a level that is less than said predetermined voltage level whereby said first means is enabled in one operation of said regulator circuit as a function of load voltage and said second means is enabled in a further operation of said regulator circuit as a function of field current;

said second means including sensing means for generating a first sensing signal that is proportional to said field current, and comparison means for comparing a field current reference signal with said sensing signal so as to supply said second control signal when said sensing signal exceeds said reference signal; and an OR network coupling the output of each of said first and second means to said current control device such that said first and second control signals can reach said current control device, said comparison means including a pulse generating network whose output is employed to supply said second control signal to the input of said current control device, and a comparator network the output of which is coupled to said pulse generating network, said comparator network providing an enabling output for triggering said pulse generating network upon said sensing signal exceeding said reference signal and supplying said second control signal as a pulsed signal.

2. A voltage regulator circuit as in claim 1 wherein said current control device comprises a semiconductor device coupled in circuit with said sensing means.

3. A voltage regulator circuit as in claim 2 wherein said semiconductor device comprises a transistor and said sensing means comprises a resistor coupled in series with the transistor emitter path, whereby said first sensing signal is generated as a voltage across said resistor.

4. A voltage regulator circuit as in claim 3 which further comprises means for selectively providing an inhibit signal and the output of said pulse generating network to the input of said OR network for generating said second control signal.

5. A voltage regulator circuit as in claim 4 wherein said first means includes a further comparator network for comparing a voltage reference signal with the voltage across said load circuit so as to provide a disabling output when the load voltage is less than said voltage reference signal and an enabling output when the load voltage exceeds said voltage reference signal, said disabling and enabling outputs of said further comparator network being coupled as a further input to said OR network.

* * * * *